United States Patent
Matthesius

(10) Patent No.: US 11,284,617 B2
(45) Date of Patent: Mar. 29, 2022

(54) REPELLENT COMPOSITION FOR HARMFUL ORGANISMS

(71) Applicant: Christian Matthesius, Langerringen (DE)

(72) Inventor: Christian Matthesius, Langerringen (DE)

(*) Notice: Subject to any disclaimer, the term of this patent is extended or adjusted under 35 U.S.C. 154(b) by 0 days.

(21) Appl. No.: 17/268,303

(22) PCT Filed: Aug. 14, 2019

(86) PCT No.: PCT/EP2019/071884
§ 371 (c)(1),
(2) Date: Feb. 12, 2021

(87) PCT Pub. No.: WO2020/035547
PCT Pub. Date: Feb. 20, 2020

(65) Prior Publication Data
US 2021/0235695 A1 Aug. 5, 2021

(30) Foreign Application Priority Data
Aug. 14, 2018 (DE) .......................... 102018006384.5
Aug. 14, 2018 (DE) .......................... 202018003749.4

(51) Int. Cl.
*A01N 31/06* (2006.01)
*C05G 5/20* (2020.01)
*A01N 65/08* (2009.01)

(52) U.S. Cl.
CPC ............... *A01N 31/06* (2013.01); *C05G 5/20* (2020.02)

(58) Field of Classification Search
CPC ........... A01N 31/06; A01N 65/08; C05G 5/20
See application file for complete search history.

(56) References Cited

U.S. PATENT DOCUMENTS

| | | |
|---|---|---|
| 7,364,747 B1 | 4/2008 | Haas |
| 7,641,923 B1 | 1/2010 | Hass |
| 2005/0220914 A1 | 10/2005 | Probasco et al. |
| 2013/0210626 A1 | 8/2013 | Ellis |

FOREIGN PATENT DOCUMENTS

| | | | | |
|---|---|---|---|---|
| CN | 101444139 A | | 5/2009 | |
| CN | 105481571 A | * | 4/2016 | ............... C05G 3/00 |
| CN | 106163286 A | | 11/2016 | |
| DE | 1800085 A1 | | 6/1970 | |
| DE | 102007061639 A1 | | 5/2009 | |
| DE | 102011120058 A1 | | 6/2013 | |
| EP | 2601841 A1 | | 6/2013 | |

(Continued)

OTHER PUBLICATIONS

Live Journal, How to Make Difficult Seeds Germinate, 2012, Live Journal, https://gardening.livejournal.com/3619117.html, pp. 1-3 (Year: 2012).*

(Continued)

*Primary Examiner* — Trevor Love
(74) *Attorney, Agent, or Firm* — Lempia Summerfield Katz LLC

(57) ABSTRACT

The disclosure relates to a composition for repelling harmful organisms in agriculture and forestry and in agriculture and horticulture for the protection of cultivated and ornamental plants, and to the use of the composition as a repellent for harmful organisms.

9 Claims, 1 Drawing Sheet

(56) References Cited

FOREIGN PATENT DOCUMENTS

| RU | 2491009 C2 | 8/2013 |
|---|---|---|
| WO | 2018037361 A1 | 3/2018 |

OTHER PUBLICATIONS

Gardening Channel, Beer as a Fertilizer and Uses Around the Garden . . . What?, 2016, Gardening Channel, https://web.archive.org/web/20161114125809/https://www.gardeningchannel.com/beer-as-a-fertilizer-and-uses-around-the-garden-what/, pp. 1-7. (Year: 2016).*

The Oxford Companion to Beer, 2012, Oxford University Press, p. 34, 3 pages (Year: 2012).*

Hall, A Little Land and a Living, 1908, The Arcadia Press, p. 276, 4 pages (Year: 1908).*

Chinese Office Action for related application No. 201980067041.3, dated Jun. 17, 2021, 8 pages.

Examination Report cited in Canadian patent application No. 3,109,596; dated Mar. 19, 2021; 6 pp.

Examination Report cited in Indian patent application No. 202137010250; dated Apr. 15, 2021; 7pp.

Biocanna: 100% Organic growing with Biocanna, 2014. URL: https://www.canna.si/node/3117.

Brouwland Catalog 2012-2013 (French), Belgium, May 22, 2012; https://www.brouwland.com/content/assets/docs/Brouwland_catalogue_FR.pdf; 225 pp.

Denis Keukeleire D., Fundamentals of beerand hop chemistry, Quimica Nova, Sociedade Brasileira De Quimica, BR, vol. 23, No. 1, Jan. 1, 2000, pp. 108-112.

Dwijendra Singh et al, Menthol containing formulation inhibits adzuki bean beetle, Callosobruchus chinensis L. (Coleoptera; Bruchidae) population in pulse grain storage, Journal of Biopesticides, Sep. 1, 2010; http://eprints.crisat.ac.in/10642/1/JournalofBiopesticides_3_3_596-603_2010.pdf; 8pp.

Edward Rój et al., Supercritical carbon dioxide hops extracts with antimicrobial properties, Open Chemistry, vol. 13, No. 1, Jan. 11, 2015, DOI: 10.1515/chem-2015-0131; pp. 1157-1171.

F. Swatonek, Die Entwicklung der Dörrobstmotte (Plodia interpunctella H.) in verschiedenen Handelsqualitäten von Sewürzpaprika, Anzeiger Fuer Schaedlingskunde Pflanzenschutz Umweltschutz., vol. 46, No. 7, Jul. 1, 1973; DOI: 10.1007/BF02303448; 1pp.

German Search Report cited in corresponding application No. DE 10 2018 006 384.5; dated Mar. 13, 2019; 8 pp.

Gupta R et al, A study of the nematicidal activity of allicin-an active principle in garlic, Allium sativum L., against root-knot nematode, Meloidogyne incognita (Kofoid and White, 1919) Chitwood, 1949, International Journal of Pest Management, Taylor and Francis, GB, vol. 39, No. 4, Jan. 1, 1993; 3 pp.

H Kato-Noguchi et al, Effects of capsaicin on plant growth, Biologia Plantarum, Apr. 1, 2003; https://link.springer.com/content/pdf/10.1023/A:1027317906839 pdf; pp. 157-159.

Hopfen $CO_2$-to ExtraktTyp Nr. 081.002, Germany, Mar. 20, 2018; https://www.flavex.com/produkt_pdf.php?id=260; 8 pp.

Hopfenextrakt isomerisiert 6%, Webshop, Jan. 13, 2015; https://www.amazon.de/Hopfenextrakt-isomerisiert-6-Alpha-30/dp/B00S6O0G2Y?ref_=ast_bbp_dp; 12 pp.

Hopfenextrakt isomerisiert 6%, Webshop, Belgium, Oct. 16, 2019; https://www.brouwland.com/de/unsere-produkte/bierbrauen/hopfen/extrakte-aroma-s-ckchen/d/hopfenextrakt-isomerisiert-6-30ml; 9 pp.

International Preliminary Report on Patentability cited in corresponding PCT app No. PCT/EP2019/071884; dated Nov. 18, 2020; 37 pp.

International Search Report and Written Opinion, and English translation of the International Search Report cited in corresponding PCT app No. PCT/EP2019/071884; dated Oct. 29, 2019; 23 pp.

Iso-Extrakt 30 % (Isomerisierter Hopfen-Extrakt), Germany, Nov. 1, 2009, http://www.hopsteiner.de/fileadmin/redeakteur/pdf/hopfenprodukte/brauereien-produkte/11_08_iso%20extrakt30.pdf; 8 pp.

Isohop (EN, REV. 2), Germany, Dec. 4, 2018, https://www.barthhaasgroup.com/images/downloads/pdfs/products/667/isohopen.pdf; 3 pp.

Jones, G. et al., Repellent and Oviposition-Deterring Effects Of Hop Beta-Acids on the Two-Spotted Spider Mite Tetranychus Urticae, Pesticide Science, Great Britain, vol. 47, No. 2, Jun. 1, 1996, pp. 165-169.

K.K. Aggarwal et al., Toxicity of L-menthol and its derivatives against four storage insects, International Journal of Tropical Insect Science, Sep. 1, 2001, https://link.springer.com/article/10.1017/S1742758400007621; 1 pp.

Mina Mohammadi et al., Ovicidal and adulticidal effects of synthetic menthol, thymol and their mixtures against Tetranychus urticae (Acari: Tetranychidae), Persian Journal of Acarology, Jan. 1, 2015, 12 pp.

MSDS: Isohop, U.K., Aug. 1, 2007, https://www.yumpu.com/en/document/view/11406869/isohopr; 3pp.

Preisliste 2010 Produkte zur Bierherstellung, Germany, Mar. 22, 2010; http://www.mikrobrau-berlin.de/PREISLISTE2008.pdf; 17 pp.

Vinay Kumar Singh, Mollusciciding Agent of Allium Sativum (Garlic) Allicin, Ann Pharmacol Pharm, Apr. 26, 2017 http://www.remedypublications.com/open-access/mollusciciding-agent-of-allium-sativum-garlic-allicin-1086.pdf; pp. 1053.1-1053.2.

Yujie Lu et al, Fumigation toxicity of allicin against three stored product pests, Journal of Stored Products Research, vol. 55, Oct. 1, 2013, https://doi.org/10.1016/j.jspr.2013.08.002; 7 pp.

Chinese Office Action for related Chinese patent application No. 201980067041 3, dated Sep. 3, 2021, 16 pages.

Canadian Office Action for related Canadian patent application No. 3,109,596, dated Sep. 27, 2021, 4 pages.

Russian Office Action for related Russian patent application No. 2021106467, dated Oct. 6, 2021, 13 pages.

Mason JR, "Mammal repellents: options and considerations for development", Proceedings of the Eighteenth Vertebrate Pest Conference, 13, Jan. 1998 (Jan. 1998), pp. 325-329.

* cited by examiner

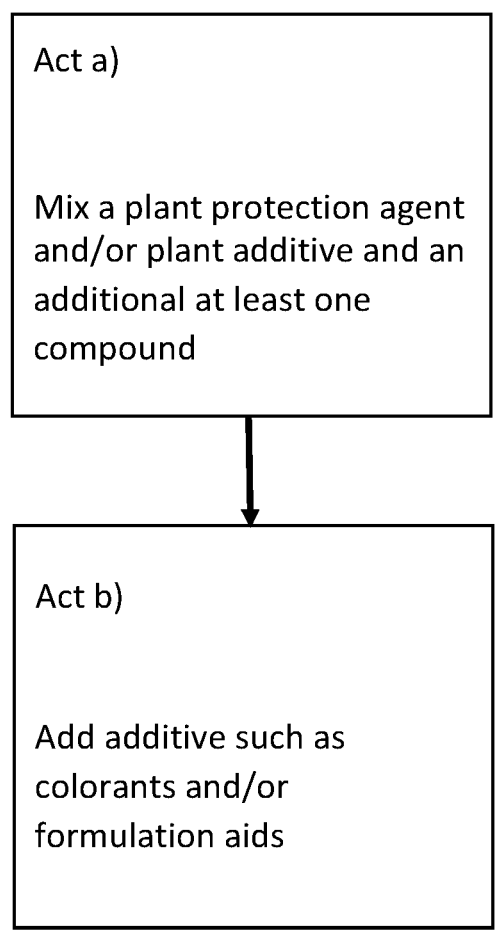

REPELLENT COMPOSITION FOR HARMFUL ORGANISMS

The present patent document is a § 371 nationalization of PCT Application Serial No. PCT/EP2019/071884, filed Aug. 14, 2019, designating the United States, which is hereby incorporated by reference, and this patent document also claims the benefit of German Patent Application No. 10 2018 006 384.5, filed Aug. 14, 2018, and German Patent Application No. 20 2018 003 749.4, filed Aug. 14, 2018, which are also hereby incorporated by reference.

TECHNICAL FIELD

The disclosure relates to a composition for repelling harmful organisms in agriculture and forestry as well as in landscaping and horticulture for the protection of cultivated and ornamental plants, and to a method for the production of this compound and the use of a repellent for repelling harmful organisms.

BACKGROUND

Harmful organisms such as wild animals can cause considerable damage in agriculture and forestry. For example, browsing by forest animals such as deer, red deer, and wild boar causes enormous crop damage. Bird predation on seeds by pheasants, pigeons, and crows and others is also a widespread problem, for example, in corn cultivation. Other known bird damage includes feeding damage and trampling of migrating, roosting, or wintering geese. Various songbird species are known to bite the buds of fruit trees (e.g., finch birds), feed on corn cobs (e.g., tree sparrow, tit, bullfinch, magpie, jay, and carrion crow), visit emerging grain or rapeseed (e.g., rook, carrion crow, woodpigeon), play with exposed potato tubers (e.g., common raven), or damage protective silage film (e.g., carrion crow). Game damage prevention agents are thus used to protect seeds and plants.

Substances have been developed against harmful birds to prevent the birds from feeding on fruit or young plants. The seeds to be treated are dressed with these substances, which are intended to make the spread seeds and subsequently the seedlings inedible for birds. However, these substances are often toxic, so that their use as plant protection agent is only permitted to a limited extent or for a limited period of time.

For example, anthraquinone has been used as seed dressing (e.g., corn, wheat, oats, and rye) to ward off bird predation after sowing. Because of its carcinogenic effect in animal tests and suspected carcinogenicity in humans, the EU rejected a further application for authorization as a plant protection agent under Directive 91/414/EEC.

Another repellent against birds and rodents used for seed dressing is thiram. The active ingredient is also used as game damage prevention agent for plants. However, thiram is toxic, can cause allergies, and damage the liver. Reaction of thiram with nitrosating agents can result in the formation of carcinogenic N-nitrosamines. Traces (e.g., 100-500 ppm) of thiram over a longer period of time in the feed of birds lead to soft eggshells, reduced laying performance and malformations in poultry.

The active ingredient ziram is used as repellent against browsing and bird predation. According to Austrian regulations, ziram can be used to protect dressed seed from bird predation. Ziram is currently not approved in Germany. Ziram may have an endocrine disrupting activity, which is why the effects of the active ingredient on human health are currently being evaluated under REACH as part of Denmark's substance evaluation.

The active ingredient methiocarb (mercaptodimethur) is also used as repellent, particularly as bird repellent in seed treatment of corn and ornamental plants. However, it is so toxic that the EU approval for its use as molluscicide (snail pellets) was withdrawn on Feb. 26, 2014, to protect birds, mammals, and non-target arthropods. Its effect as neurotoxin occurs via inhibition of acetylcholinesterase. Methiocarb also affects the nervous system of snails, which initially become hyperactive but then lose the muscle tone and die on the spot. The active ingredient is also very toxic to aquatic life. It is also toxic to humans and can cause vomiting, diarrhea, respiratory distress, and pulmonary edema.

The repellents known in the prior art are toxic and/or harmful in other ways or are suspected of being toxic and/or harmful in other ways. Accordingly, the disclosure is based on the object of providing an improved agent for repelling harmful organisms, in particular, against game bites (e.g., protection against game eating seedlings, parts of seedlings, plants, and the like) and bird predation (e.g., protection against birds feeding on respective seeds, seedlings, plants, and the like).

BRIEF DESCRIPTION OF THE DRAWING

FIG. 1 depicts a method for preparing a repellent composition, according to an embodiment.

DETAILED DESCRIPTION

The object is achieved by the composition and the use of the composition as disclosed herein. The scope of the present disclosure is defined solely by the appended claims and is not affected to any degree by the statements within this summary. The present embodiments may obviate one or more of the drawbacks or limitations in the related art.

The composition for repelling harmful organisms includes a mixture, wherein the mixture includes at least one compound selected from the group consisting of humulones (α-acids), lupulones (β-acids), isohumulones (iso-α-acids), oxidation products of the lupulones such as hulupones and luputriones, allo-isohumulones, abeo-isohumulones (oxidized isohumulones), anti-isohumulones, spiro-isohumulones, humelic acids, dihydro-isohumulones (Rho-isohumulones), tetrahydro-isohumulones and hexahydro-isohumulones.

The composition for repelling harmful organisms may further include at least one plant protection agent and/or plant additive.

Depending on the at least one plant protection agent and/or plant additive, the composition is biodegradable, non-toxic, safe to use and environmentally safe, and can thus also be used in organic agriculture (organic farming) and in organic forestry.

The composition serves to repel harmful organisms, in particular birds and/or mammals. In particular, it can be used as repellent or game damage prevention agent. It can be used to protect seeds, cultivated plants, and/or ornamental plants from bird predation and/or game bites.

The term "harmful organisms" as used herein in the description and in the claims designates pests and nuisances, such as, for example, birds (including, but not limited to, crows, in particular rooks, pigeons, pheasants) and mammals (including, but not limited to, hares, rats, mice, deer, wild boars), insects, spiders, and the like, as well as bacteria, viruses and fungi. In the context of the term "game damage prevention agent," the term "harmful organisms" indicates exclusively birds (including, but not limited to, crows, especially rooks, pigeons, pheasants) and mammals (including, but not limited to, rabbits, rats, mice, deer, wild boars) as pests and nuisances, wherein these are expressly not limited to game or wild animals.

The term "game damage prevention agent" as used herein in the description and in the claims indicates an agent for the control of harmful organisms (e.g., birds and mammals) which, in agriculture, cause damage to land used by farmers and their seeds and crops, or which, in forestry, cause damage to flora by browsing, peeling, and rubbing (sweeping) on forest plants.

The term "cultivated and ornamental plants" as used herein in the description and in the claims includes all plants cultivated in agriculture and forestry, and in landscaping and horticulture, such as cereals like wheat, spelt, rye, oats, barley, triticale, millet, corn, rice and bamboo seeds, legumes, vegetables such as potatoes, stone fruit, pome fruit, soft fruit and nut fruit plants, cucurbits, woody plants, vines, as well as spice and medicinal plants, ornamental plants and the like.

The term "repellent" as used herein in the description and in the claims includes agents which have a repellent or expulsive effect on other living organisms, especially harmful organisms. Frequently, such agents, by their unpleasant taste or odor, cause the harmful organisms to keep away, for example, from food or from certain places.

In a particular embodiment, the composition includes at least 1 vol %, based on the volume of the composition, of the mixture, (e.g., at least 5 vol %, at least 7 vol %, at least 8 vol %, or at least 10 vol % of the mixture, based on the volume of the composition). In another embodiment, the composition includes at least 12 vol %, based on the volume of the composition, of the mixture, (e.g., at least 17 vol %, at least 21 vol %, at least 25 vol %, or at least 27 vol % of the mixture, based on the volume of the composition). In another particular embodiment, the composition includes up to 99.9 vol %, based on the volume of the composition, of the mixture, (e.g., 1-99 vol %, 5-98 vol %, 30-95 vol %, or 35-80 vol % of the mixture, based on the volume of the composition).

In an embodiment, the composition may include water as remainder.

In a further embodiment, the composition includes at least 1 vol % based on the volume of the composition, of the plant protection agent and/or plant additive, (e.g., at least 2 vol %, at least 5 vol %, at least 8 vol %, or at least 10 vol %, of the plant protection agent and/or plant additive, based on the volume of the composition). In a further embodiment, the composition includes at least 20 vol %, based on the volume of the composition, of the plant protection agent and/or plant additive, (e.g., at least 35 vol %, at least 50 vol %, at least 65 vol %, or at least 80 vol % of the plant protection agent and/or plant additive, based on the volume of the composition). In another particular embodiment, the composition includes up to 99.9 vol %, based on the volume of the composition, of the plant protection agent and/or plant additive, (e.g., 1-99 vol %, 5-98 vol %, 30-95 vol % or 35-80 vol % of the plant protection agent and/or plant additive, based on the volume of the composition).

In another embodiment, the composition includes at least 1 vol %, based on the volume of the composition, of the mixture, at least 1 vol %, based on the volume of the composition, of a plant protection agent and/or plant additive, and water as remainder.

Suitable humulones include cohumulone, adhumulone, humulone (n-humulone), prehumulone, and posthumulone, (e.g., cohumulone, adhumulone, and humulone).

Suitable lupulones include colupulone, adlupulone, lupulone (n-lupulone), prelupulone, and postlupulone.

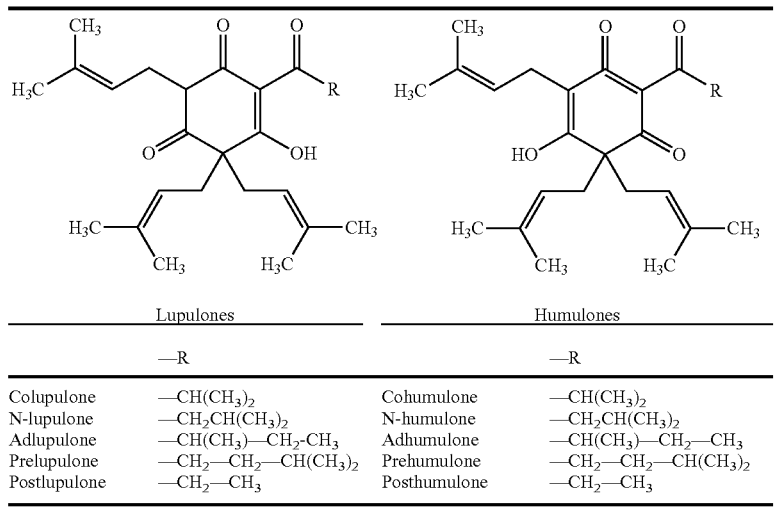

| Lupulones | | Humulones | |
|---|---|---|---|
| | —R | | —R |
| Colupulone | —CH(CH₃)₂ | Cohumulone | —CH(CH₃)₂ |
| N-lupulone | —CH₂CH(CH₃)₂ | N-humulone | —CH₂CH(CH₃)₂ |
| Adlupulone | —CH(CH₃)—CH₂-CH₃ | Adhumulone | —CH(CH₃)—CH₂—CH₃ |
| Prelupulone | —CH₂—CH₂—CH(CH₃)₂ | Prehumulone | —CH₂—CH₂—CH(CH₃)₂ |
| Postlupulone | —CH₂—CH₃ | Posthumulone | —CH₂—CH₃ |

Suitable isohumulones are cis-isohumulones and trans-isohumulones, in particular isocohumulone, isoadhumulone, isohumulone (iso-n-humulone), isoprehumulone, and isoposthumulone, (e.g., isocohumulone, isoadhumulone, isohumulone). Suitable isohumulones include cis-isocohumulone, cis-isoadhumulone, cis-isohumulone (cis-iso-n-humulone), cis-isoprehumulone, cis-isoposthumulone, trans-isocohumulone, trans-isoadhumulone, trans-isohumulone (trans-iso-n-humulone), trans-isoprehumulone and trans-isoposthumulone, and chemically modified isohumulone derivatives such as dihydro-isohumulones, tetrahydro-isohumulones, and hexahydro-isohumulones. In one embodiment, the isohumulones are cis-isohumulones.

hexahydro-isoadhumulone, trans-hexahydro-isohumulone (trans-hexahydro-iso-n-humulone), trans-hexahydro-isoprehumulone, and trans-hexahydro-isoposthumulone.

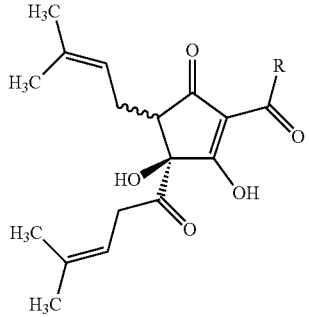

| | —R |
|---|---|
| Rho-/Tetrahydro-/Hexahydro-Isocohumulone | —CH(CH$_3$)$_2$ |
| Rho-/Tetrahydro-/Hexahydro-Iso-n-Humulone | —CH$_2$CH(CH$_3$)$_2$ |
| Rho-/Tetrahydro-/Hexahydro-Isoadhumulone | —CH(CH$_3$)—CH$_2$—CH$_3$ |
| Rho-/Tetrahydro-/Hexahydro-Isoprehumulone | —CH$_2$—CH$_2$—CH(CH$_3$)$_2$ |
| Rho-/Tetrahydro-/Hexahydro-Isoposthumulone | —CH$_2$—CH$_3$ |

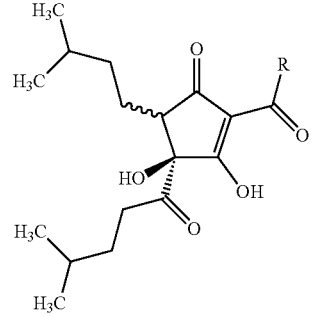

| | —R |
|---|---|
| Isocohumulone | —CH(CH$_3$)$_2$ |
| Iso-n-humulone | —CH$_2$CH(CH$_3$)$_2$ |
| Isoadhumulone | —CH(CH$_3$)—CH$_2$—CH$_3$ |
| Isoprehumulone | —CH$_2$—CH$_2$—CH(CH$_3$)$_2$ |
| Isoposthumulone | —CH$_2$—CH$_3$ |

Suitable dihydro-isohumulones include cis-dihydro-isocohumulone, cis-dihydro-isoadhumulone, cis-dihydro-isohumulone (cis-dihydro-iso-n-humulone), cis-dihydro-isoprehumulone, cis-dihydro-isoposthumulone, trans-dihydro-isocohumulone, trans-dihydro-isoadhumulone, trans-dihydro-isohumulone (trans-dihydro-iso-n-humulone), trans-dihydro-isoprehumulone, and trans-dihydro-isoposthumulone.

Suitable tetrahydro-isohumulones include cis-tetrahydro-isocohumulone, cis-tetrahydro-isoadhumulone, cis-tetrahydro-isohumulone (cis-tetrahydro-iso-n-humulone), cis-tetrahydro-isoprehumulone, cis-tetrahydro-isoposthumulone, trans-tetrahydro-isocohumulone, trans-tetrahydro-isoadhumulone, trans-tetrahydro-isohumulone (trans-tetrahydro-iso-n-humulone), trans-tetrahydro-isoprehumulone, and trans-tetrahydro-isoposthumulone.

Suitable hexahydro-isohumulones include cis-hexahydro-isocohumulone, cis-hexahydro-isoadhumulone, cis-hexahydro-isohumulone (cis-hexahydro-iso-n-humulone), cis-hexahydro-isoprehumulone, cis-hexahydro-isoposthumulone, trans-hexahydro-isocohumulone, trans- Suitable hulupones include n-hulupone, cohulupone, and adhulupone.

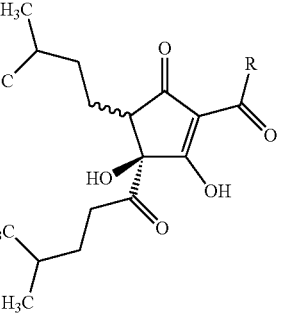

| | —R |
|---|---|
| Cohulupone/-luputrione | —CH(CH$_3$)$_2$ |
| N-hulupone/-luputrione | —CH$_2$CH(CH$_3$)$_2$ |
| Adhulupone/-luputrione | —CH(CH$_3$)—CH$_2$—CH$_3$ |
| Prehulupone/-luputrione | —CH$_2$—CH$_2$—CH(CH$_3$)$_2$ |
| Posthulupone/-luputrione | —CH$_2$—CH$_3$ |

In an embodiment, the mixture includes humulones, lupulones, isohumulones, hulupones, dihydro-isohumulones, tetrahydro-isohumulones, and/or hexahydro-isohumulones. In an embodiment, the mixture includes humulones, isohumulones, dihydro-isohumulones, tetrahydro-isohumulones and/or hexahydro-isohumulones. In a further embodiment, the mixture includes isohumulones, tetrahydro-isohumulones, and/or hexahydro-isohumulones.

In a particularly embodiment, the mixture includes isohumulones. The mixture may include other of the aforementioned compounds, such as humulones or lupulones. Due to their bitterness, isohumulones achieve a particularly good effect in repelling harmful organisms, especially birds and/or mammals.

In an embodiment, the mixture included by the composition is obtained from hops, in particular from hop cones (e.g., hop umbels, female inflorescences, ears) and/or their glandular hairs (e.g., hop glands, lupuli glandula, hop meal, lupulin). The term hop cones includes fresh, dried, ground, and pressed/pelleted hop cones unless otherwise described. Hop cones may be used fresh and/or dried, among others. The mixture may be obtained from raw hops, hop pellets, or hop extracts. Hop pellets may include ground hops. Hop extracts may include, but are not limited to, ethanol extracts, ether extracts, and $CO_2$ extracts (extraction with supercritical carbon dioxide).

Suitable mixtures are selected from the group consisting of ground hop cones, hop meal, hop resin, hop hard resin, hop soft resin, α-soft resin, β-soft resin, humulones (α-acids) as well as their derivatives, in particular isohumulones-dihydro-isohumulones, tetrahydro-isohumulones, and hexahydro-isohumulones, and lupulones (β-acids) as well as their derivatives, in particular hulupones and luputriones.

In an embodiment, the mixture includes a fully or partially isomerized ethanol or $CO_2$ extract. The term "isomerized" refers to the whole or partial conversion of the humulones to isohumulones. In an embodiment, 1-100% of the humulones are converted, (e.g., more than 5%, 15%, 30%, or more than 60% of the humulones are converted). In an embodiment, 50-100% of the humulones are converted, in particular, more than 65%, 80%, 95%, or more than 99% of the humulones are converted. In an embodiment, the mixture includes an ethanol extract of hop cones, in particular a fully or partially isomerized extract in which hop cones have been extracted with an alcohol-water mixture. The mixture may include the so-called pure resin extract. In another embodiment, the mixture includes the so-called tannin extract as well as the pure resin extract. In a particularly embodiment, the mixture includes a fully or partially isomerized $CO_2$ extract.

The mixture may contain blends of different extracts.

Suitable hop varieties include wild hops, cultivated hops, aroma hops, bitter hops, high alpha bitter varieties, high alpha varieties. In certain embodiments, the hop varieties include high alpha bitter varieties or high alpha varieties.

Suitable plant protection agents and plant additives (also called plant strengthening agents) include pesticides (e.g., pest control agents), such as insecticides, rodenticides, acaricides, bactericides, fungicides, nematicides, ovicides, virucides and molluscicides, herbicides (e.g., weed control agents), in particular graminicides, growth regulators, seed protection agents, storage protection agents, fertilizers. The plant protection agents and the plant additives are suitable for organic agriculture and organic forestry.

Suitable fertilizers include liquid fertilizers, such as fertilizer solutions and suspensions, fertilizer granules or salts. Suitable liquid fertilizers include foliar fertilizers.

In an embodiment, the plant protection agent and/or plant additive is a liquid fertilizer.

Suitable fertilizers include, but are not limited to, nitrogen, potassium, phosphorus, magnesium, sulfur, and calcium fertilizers, as well as fertilizers containing boron, chlorine, copper, iron, manganese, molybdenum, nickel, and/or zinc.

In an embodiment, the composition includes 5-30 vol %, (e.g., 7-25 vol %), based on the volume of the composition, of a fully isomerized $CO_2$ extract of hops. In one embodiment, the composition may include at least 10-17 vol %, based on the volume of the composition, of the extract.

In an embodiment, the composition includes 8-30 vol %, (e.g., 12-25 vol %), based on the volume of the composition, of a fully isomerized $CO_2$ extract of aroma hops. In one embodiment, the composition may include at least 17 vol %, based on the volume of the composition, of the extract.

In a further embodiment, the composition includes 5-27 vol %, (e.g., 7-21 vol %), based on the volume of the composition, of a fully isomerized $CO_2$ extract of high alpha varieties. In one embodiment, the composition may include at least 10 vol %, based on the volume of the composition, of the extract.

In another embodiment, the composition includes 10-35 vol %, (e.g., 15-25 vol %), based on the volume of the composition, of a mixture including 30% (w/w) isohumulones, tetrahydro-isohumulones, and/or hexahydro-isohumulones (e.g., isohumulones). In one embodiment, the composition may include at least 20 vol %, based on the volume of the composition, of the mixture. The mixture may also include a different proportion of isohumulones, tetrahydro-isohumulones, and/or hexahydro-isohumulones, (e.g., isohumulones), for example between 10 and 60% (w/w).

In an embodiment, the composition contains at least 3 wt % (w/w), (e.g., at least 4.5 wt % isohumulones, tetrahydro-isohumulones and/or hexahydro-isohumulones), based on the weight of the composition.

For example, the composition contains 3-10.5 wt % (w/w), (e.g., 4.5-7.5 wt % isohumulones, tetrahydro-isohumulones and/or hexahydro-isohumulones), (e.g., isohumulones), based on the weight of the composition. For example, the mixture is an isomerized hop extract containing 30% (w/w) isohumulones, tetrahydro-isohumulones, and/or hexahydro-isohumulones in aqueous solution (in particular, isomerized alpha acids of hops). Because the density of such a mixture is similar to that of water or conventional plant additive, a composition including 10-35 vol % (based on the volume of the composition) of the mixture contains a proportion of about 3-10.5 wt % isohumulones, tetrahydro-isohumulones and/or hexahydro-isohumulones.

In another embodiment, the composition includes 20 vol %, based on the volume of the composition, of the mixture, and 80 vol %, based on the volume of the composition, of a liquid fertilizer, the mixture including 30% (w/w) isohumulones, tetrahydro-isohumulones, and/or hexahydro-isohumulones, (e.g., isohumulones).

The composition can be used as dressing agent for the treatment of seeds, seedlings, or young plants of all cultivated and ornamental plants. Furthermore, the composition can be used as repellent for protection against game bites and/or bird predation.

The composition may include further additives such as dyes, adhesives, carriers, wetting agents, diluents, solvents such as water and/or formulation aids.

In an embodiment, the composition additionally includes colorants. A conspicuous coloration of seed potatoes, cereal seeds such as corn, or other seeds may prevent their accidental use as feed or for food purposes. In addition, a colored composition is helpful in assessing the completeness of the dressing.

In an embodiment, the composition additionally includes an adhesion agent. Suitable adhesion agents enable the composition to adhere better to the seed or to the plant. In an embodiment, the composition is rainproof, e.g., it is not or only slightly rinsed from the seed or from the plant by falling water.

The composition can be formulated as liquid, in particular as aqueous solution, as powder, as water-soluble granules or as a water-soluble powder.

In an embodiment, the composition additionally includes customary formulation aids to enable an easiest possible application and good distribution on the seeds or the plants. In the case of plants, this is achieved by improved wetting of the leaf surfaces.

According to a further aspect, there is provided seed treated, in particular dressed, with one of the compositions described above.

A further object of the disclosure is a method for preparing the composition, as depicted in FIG. 1. The method includes the following act a): mixing a plant protection agent and/or plant additive and a mixture including at least one compound selected from the group consisting of humulones, lupulones, isohumulones, oxidation products of lupulones such as hulupones and luputriones, allo-isohumulones, abeo-isohumulones, anti-isohumulones, spiro-isohumulones, humelic acids, dihydro-isohumulones, tetrahydro-isohumulones and hexahydro-isohumulones.

Act a) of the method may be performed before use of the composition to be prepared. In another embodiment, in act a1), a plant protection agent and/or plant additive is applied to seeds or to plants and, in act a2), a mixture including at least one compound selected from the group consisting of humulones, lupulones, isohumulones, oxidation products of lupulones such as hulupones and luputrions, allo-isohumulones, abeo-isohumulones, anti-isohumulones, spiro-isohumulones, humelic acids, dihydro-isohumulones, tetrahydro-isohumulones, and hexahydro-isohumulones, is applied to the same seeds or the same plants. The acts a1) and a2) may be performed in any order, staggered in time, overlapping in time, or sequentially, to perform mixing of the plant protection agent and/or plant additive and the mixture (act a)) on the seed or the plant.

The method may further include the following act b): adding additives such as colorants and/or formulation aids.

Act b) may be performed before, after, or simultaneously with act a). Act b) may be performed several times during the method.

Another object of the disclosure is the use of a repellent for repelling harmful organisms, wherein the repellent includes a mixture derived from hops and/or wherein the repellent includes a mixture including at least one compound selected from the group consisting of humulones, lupulones, isohumulones, oxidation products of lupulones such as hulupones and luputriones, allo-isohumulones, abeo-isohumulones, anti-isohumulones, spiro-isohumulones, humelic acids, dihydro-isohumulones, tetrahydro-isohumulones, and hexahydro-isohumulones.

The use may be used to protect any cultivated or ornamental plant, in particular any seed and any plant used in agriculture, in landscaping and horticulture and/or in forestry.

In an embodiment, the repellent includes the composition as disclosed herein.

In an embodiment, a fully or partially isomerized hop extract, for example, fully isomerized $CO_2$ extract, in particular as part of the composition, is used as repellent for repelling harmful organisms.

In an embodiment, isohumulones are used for repelling the harmful organisms, such as birds and/or mammals. For example, the isohumulones are included in a mixture derived from hops, and which may in particular be a fully or partially isomerized hop extract. The isohumulones may be contained as iso-alpha acids in the hop extract and may contain, for example, isohumulone, isocohumulone, and isoadhumulone and others of the isohumulones mentioned above. The isohumulones may be included in the mixture, wherein the mixture may be part of one of the compositions described above or the repellent.

In an embodiment, the repellent is used for treating seed, in particular for seed dressing. In agriculture and forestry, as well as in landscaping and horticulture, dressing or seed dressing indicates the treatment of seed and seedlings, to protect the seed or planting for example from pests to which seedlings and young plants are particularly susceptible.

In an embodiment, seed, (for example, cereals such as wheat, spelt, rye, oats, barley, triticale, millet, corn, rice, legumes, and bamboo seeds), is dressed with the repellent prior to planting. Dressing may take place in a dressing drum, a concrete mixer, a mortar trough, or another suitable container. The dressed seed can be properly stored until sowing or be used immediately after dressing. If necessary, talc can be added to the dressed seed before sowing to improve its flowability.

In another embodiment, seed potatoes are dressed with the repellent prior to laying. Dressing can be performed directly in the planter. In another embodiment, dressed seed potatoes are properly stored until planting.

In another embodiment, the repellent is applied to the plants to be protected using plant protection equipment such as the field sprayer, garden sprayer or other spraying equipment.

The disclosure is further described in more detail by, but not limited to, the following examples.

Example 1

One unit of corn seed (50,000 grains) is placed in a dressing drum. A well-mixed dressing containing 50 ml of a hop extract, which contains 30% (w/w) isohumulones in aqueous solution, and 200 ml of a zinc oxide fertilizer suspension (700 g Zn/l) is added briskly to the seed while stirring constantly. The seed is stirred until the dressing is evenly distributed on the grains.

Example 2

One unit of cereal seed (50 kg) is placed in a dressing drum. A well-mixed dressing containing 50 ml of a hop extract, which contains 30% (w/w) isohumulones in aqueous solution, and 200 ml of a zinc oxide fertilizer suspension (700 g Zn/l) is added briskly to the seed while stirring constantly. The seed is stirred until the dressing is evenly distributed on the grains.

Example 3

To protect against bird predation, corn dressed as in Example 1 was sown in the open on nine fields where bird predation by crows occurs regularly.

Experimentally, it was observed that the damage that regularly occurred due to bird predation of the corn seed in previous years was drastically reduced and partially no longer occurred due to the application of the composition or the use of a repellent. The results of the experiments are shown in Table 1.

TABLE 1

| | Bird predation | |
| --- | --- | --- |
| Field No. | Damage caused by bird predation to seed (comparative example)* | Damage caused by bird predation to dressed seed from example 1 |
| 1 | present | none |
| 2 | very strong | none |
| 3 | very strong | low |
| 4 | massive | none |
| 5 | very strong | low |

TABLE 1-continued

Bird predation

| Field No. | Damage caused by bird predation to seed (comparative example)* | Damage caused by bird predation to dressed seed from example 1 |
|---|---|---|
| 6 | strong | none |
| 7 | massive | low |
| 8 | very strong | low |
| 9 | very strong | low |

*Damages in previous years without dressing with the composition

Although the disclosure has been described and illustrated more specifically in detail by the exemplary embodiments, the disclosure is not restricted by the disclosed examples and other variations may be derived therefrom by a person skilled in the art without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. Seed comprising:
a composition for repelling birds,
wherein the seed is treated with the composition, and
wherein the composition comprises:
a mixture comprising at least one compound selected from the group consisting of humulones, lupulones, isohumulones, oxidation products of lupulones, hulupones, luputriones, allo-isohumulones, abeo-isohumulones, anti-isohumulones, spiro-isohumulones, humelic acids, dihydro-isohumulones, tetrahydro-isohumulones, and hexahydro-isohumulones, and
wherein the composition comprises at least 3 wt. % isohumulones, tetrahydro-isohumulones, and/or hexahydro-isohumulones, based on a weight of the composition.

2. A method comprising:
treating a seed with a composition, wherein the composition comprises a mixture comprising at least one compound selected from the group consisting of humulones, lupulones, isohumulones, oxidation products of lupulones, hulupones, luputriones, allo-isohumulones, abeo-isohumulones, anti-isohumulones, spiro-isohumulones, humelic acids, dihydro-isohumulones, tetrahydro-isohumulones, and hexahydro-isohumulones; and
repelling birds with the treated seed,
wherein the composition comprises at least 3 wt. % isohumulones, tetrahydro-isohumulones, and/or hexahydro-isohumulones, based on a weight of the composition.

3. The method of claim 2, wherein the mixture is derived from hops.

4. The method of claim 2, further comprising:
planting the treated seed.

5. The method of claim 2, further comprising:
using the treated seed for protection against bird predation,
wherein the composition further comprises at least one plant protection agent and/or plant strengthening agent, and
wherein the at least one plant protection agent and/or plant strengthening agent is a fertilizer.

6. The method of claim 2, further comprising:
protecting the seed itself, cultivated plants, and/or ornamental plants from bird predation, using the treated seed.

7. The method of claim 2, wherein the mixture comprises the isohumulones, and
wherein the isohumulones are obtained from hops.

8. The method of claim 2, wherein the mixture is an at least partially isomerized hop extract, and
wherein the composition comprises 5-99.9 vol % of the mixture, based on a volume of the composition.

9. The method of claim 5, wherein the fertilizer comprises nitrogen, potassium, phosphorous, magnesium, sulfur, calcium, boron, chlorine, copper, iron, manganese, molybdenum, nickel, zinc, or a combination thereof.

* * * * *